United States Patent [19]
Buzzell et al.

[11] Patent Number: 6,035,498
[45] Date of Patent: Mar. 14, 2000

[54] STRETCHED FASTENERS

[75] Inventors: Keith G. Buzzell, Waberboro, Me.; George A. Provost, Litchfield; Richard G. Maydra, Manchester, both of N.H.

[73] Assignee: Velcro Industties B.V., Curacao, Netherlands Antilles

[21] Appl. No.: 09/070,865

[22] Filed: Apr. 30, 1998

Related U.S. Application Data

[63] Continuation-in-part of application No. 08/789,637, Jan. 27, 1997, abandoned, and a continuation-in-part of application No. PCT/US98/01271, Jan. 23, 1998.

[51] Int. Cl.[7] .................................................. A44B 18/00
[52] U.S. Cl. ............................... 24/452; 24/442; 24/445; 24/446
[58] Field of Search .............................. 24/452, 451, 450, 24/447, 448, 449, 446, 444, 442, 443

[56] References Cited

U.S. PATENT DOCUMENTS

| | | |
|---|---|---|
| 3,230,134 | 1/1966 | Studer . |
| 3,312,583 | 4/1967 | Rochlis . |
| 3,372,444 | 3/1968 | Mathison . |
| 3,632,716 | 1/1972 | Fairbanks . |
| 3,682,760 | 8/1972 | Fairbanks . |
| 3,694,537 | 9/1972 | Fairbanks . |
| 3,833,973 | 9/1974 | Schwarz . |
| 3,954,933 | 5/1976 | Rasmussen . |
| 4,001,366 | 1/1977 | Brumlik . |
| 4,056,593 | 11/1977 | Albareda . |
| 4,140,826 | 2/1979 | Liu . |
| 4,189,809 | 2/1980 | Sotos . |
| 4,235,834 | 11/1980 | Vetter et al. . |
| 4,261,944 | 4/1981 | Hufnagel et al. . |
| 4,285,100 | 8/1981 | Schwarz . |
| 4,287,147 | 9/1981 | Hungerford . |
| 4,368,565 | 1/1983 | Schwarz . |
| 4,384,392 | 5/1983 | Allen . |
| 4,409,160 | 10/1983 | Kogo et al. . |
| 4,536,429 | 8/1985 | Mercer . |
| 4,555,377 | 11/1985 | Whiteside et al. . |
| 4,672,722 | 6/1987 | Malamed . |
| 4,677,011 | 6/1987 | Matsuda . |
| 4,705,710 | 11/1987 | Matsuda . |
| 4,794,028 | 12/1988 | Fischer . |
| 4,894,060 | 1/1990 | Nestegard . |
| 4,920,617 | 5/1990 | Higashinaka . |
| 4,970,039 | 11/1990 | Long . |
| 5,042,221 | 8/1991 | Pacione . |
| 5,060,443 | 10/1991 | Pacione . |
| 5,133,166 | 7/1992 | Pacione . |
| 5,137,661 | 8/1992 | Kanome et al. . |
| 5,144,786 | 9/1992 | Pacione . |
| 5,230,851 | 7/1993 | Thomas . |
| 5,260,015 | 11/1993 | Kennedy et al. . |

(List continued on next page.)

FOREIGN PATENT DOCUMENTS

| | | |
|---|---|---|
| 1 785 284 | 12/1972 | Germany . |
| 1 437 005 | 5/1976 | Japan . |

*Primary Examiner*—Victor N. Sakran
*Attorney, Agent, or Firm*—Fish & Richardson P.C.

[57] ABSTRACT

A running length of fastener product is formed of longitudinally pre-oriented synthetic resin. The product is characterized by a base web and an array of discrete fastener elements protruding from at least one side of the web, the web being in a laterally stretched molecular oriented condition. After forming a preform having discrete fastener elements integral with a base web in a stretchable state, the preform is stretched in a manner that substantially increases the fastener element spacing and reduces the thickness of the base web. A machine is shown that is capable of lengthwise orienting before forming and widthwise stretching after forming, which employs controlled heating to render the product widthwise stretchable while preserving or achieving a desired shape of the fastener elements. There are shown fastener products that include products that are laterally stretched to between two and ten times the width of the original preform fastener products, having lateral rip resistance due to molecular orientation of film form webs produced by stretching, applied to complex or extensive surfaces. Also shown are laminated products formed by joining an added material to the stretched web, and methods for laminating.

17 Claims, 11 Drawing Sheets

U.S. PATENT DOCUMENTS 5,262,107 11/1993 Hovis et al. .
5,455,992 10/1995 Kurschatke et al. .
5,472,652 12/1995 Yoshimura .
5,512,234 4/1996 Takizawa et al. .
5,537,723 7/1996 Yoshida et al. .

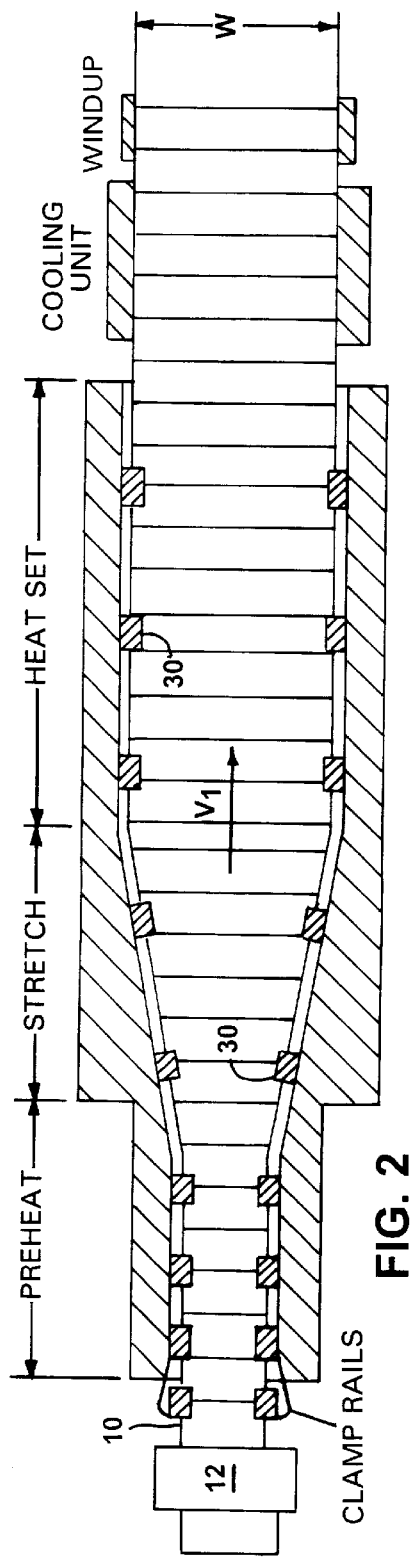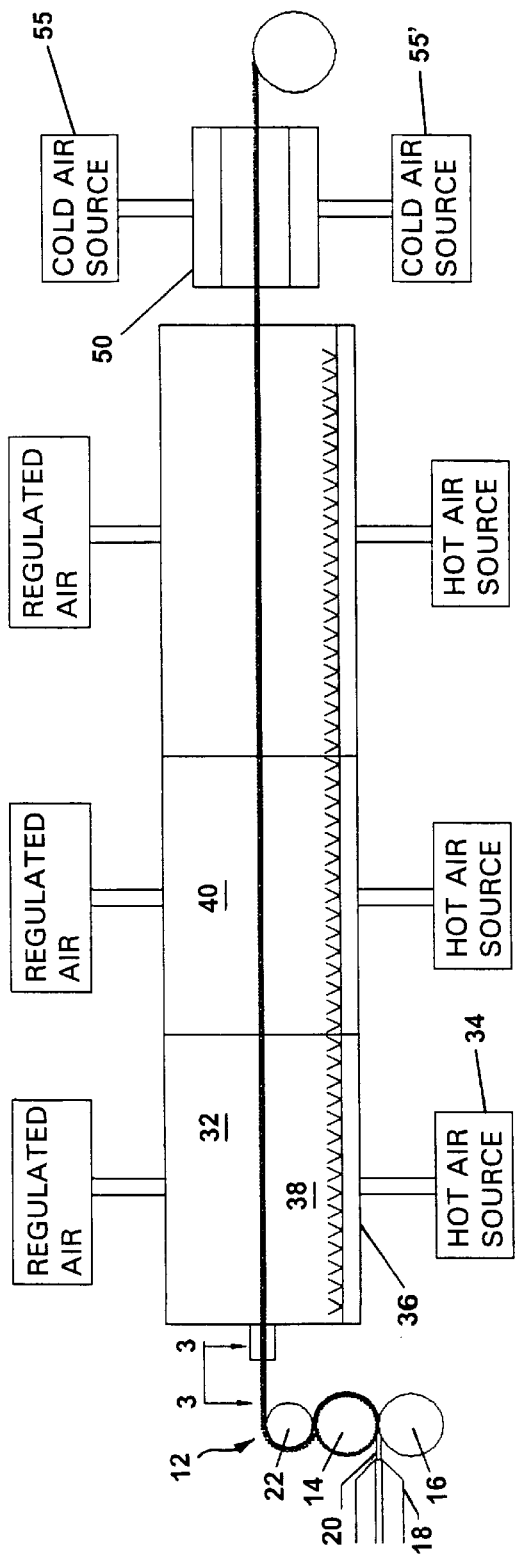
FIG. 2
FIG. 1

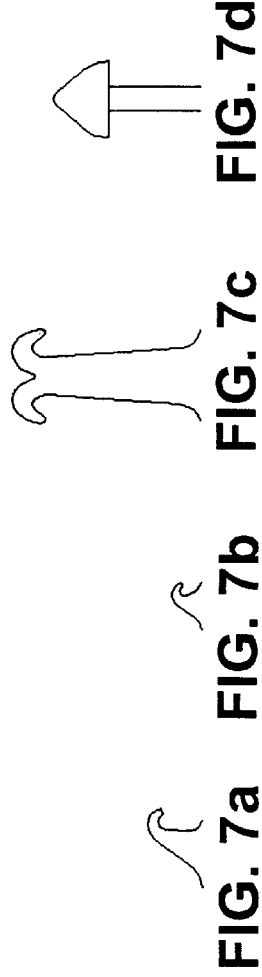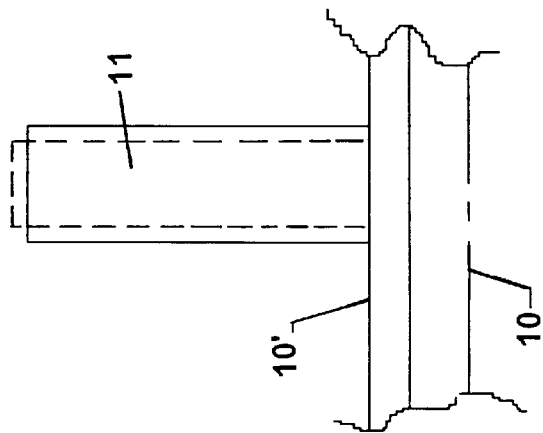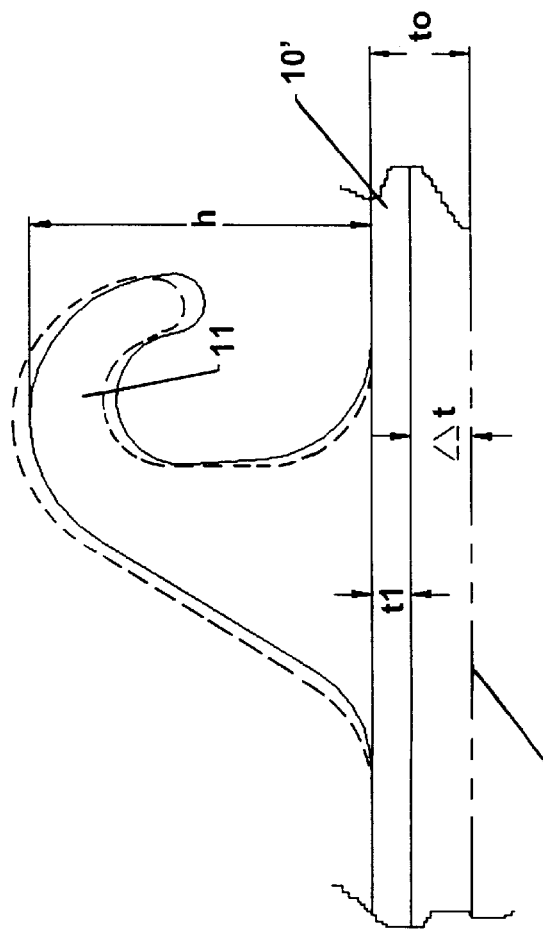

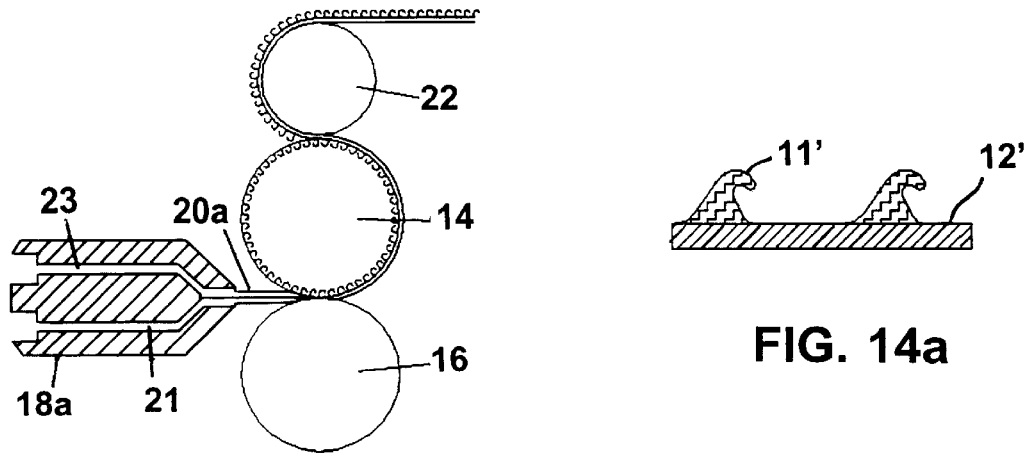
FIG. 14
FIG. 14a
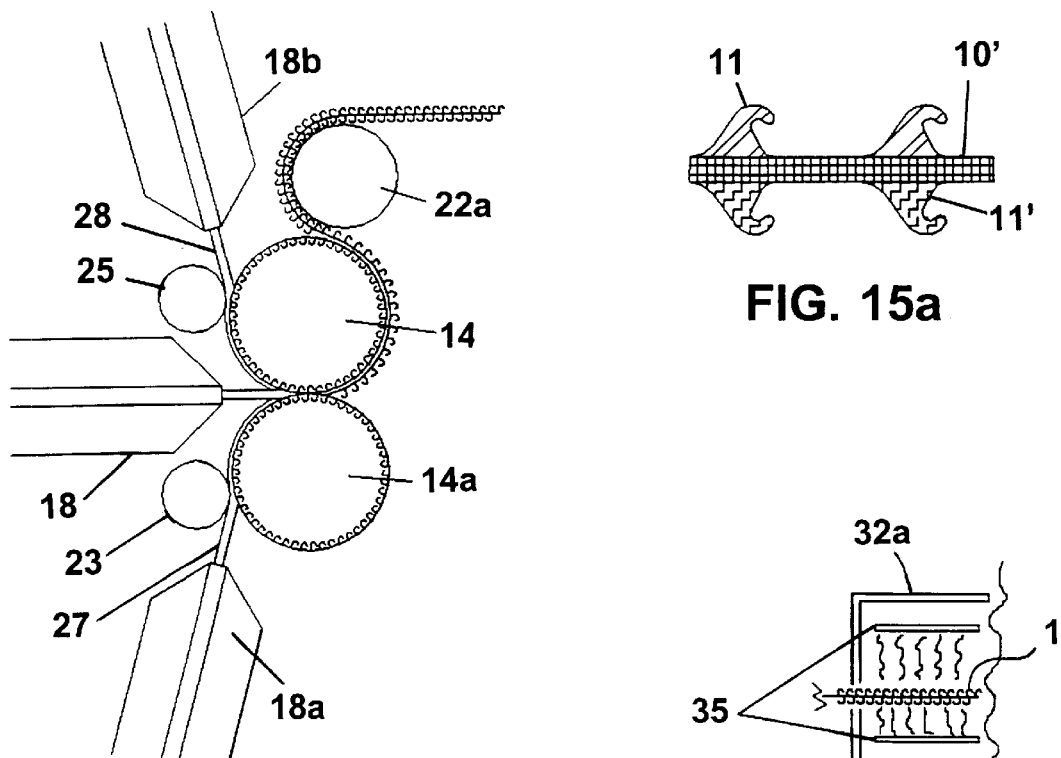
FIG. 15
FIG. 15a
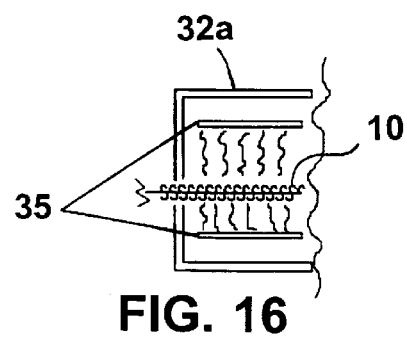
FIG. 16

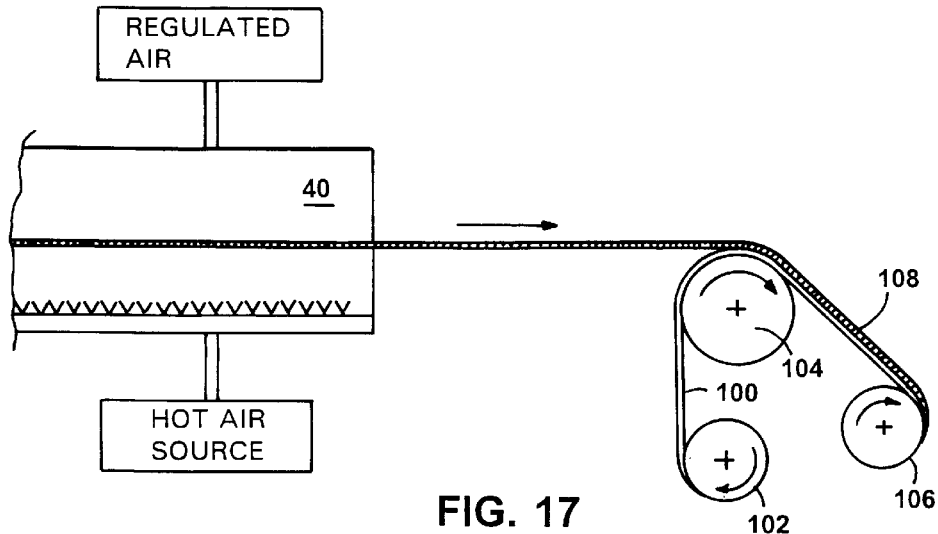
FIG. 17
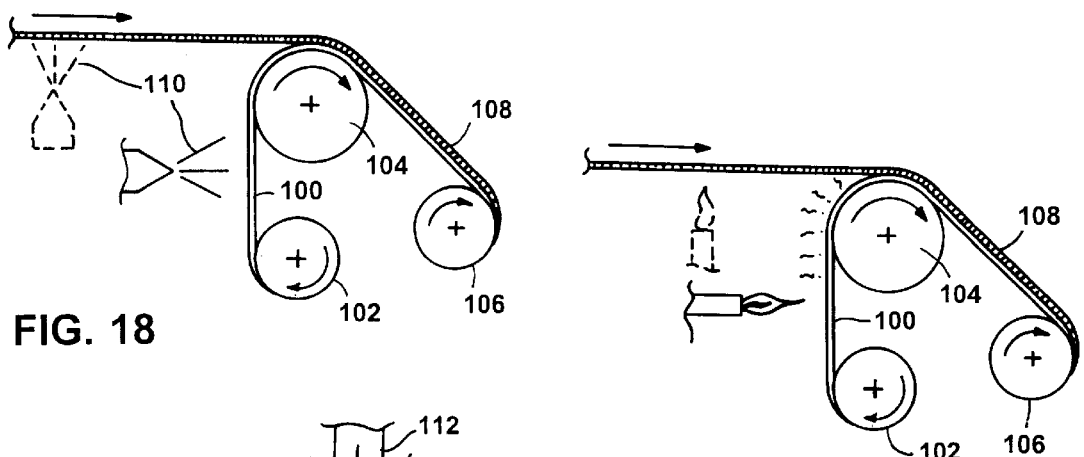
FIG. 18
FIG. 19
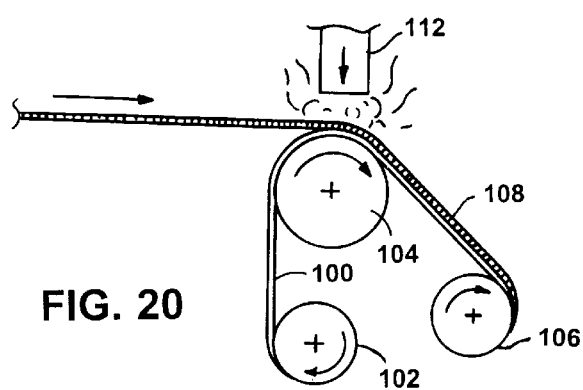
FIG. 20

STRETCHED FASTENERS

This application is a continuation-in-part of 08/789,637, filed Jan. 27, 1997, abandoned, and a continuation-in-part of PCT/US98/01271, filed Jan. 23, 1998.

BACKGROUND OF THE INVENTION

This invention relates to sheet-form fastening members of synthetic resin and to methods and machines for their manufacture.

An important aspect of the invention concerns hook fastener members for hook and loop fastening. These are formed of synthetic resin in running lengths. Typically there are multitudes of fastener elements, i.e. hundreds or even thousands of discrete hook elements per square inch. These are typically arranged in neat rows in the machine direction, i.e. in the direction in which the forming system produces the product.

These hook elements stand discretely from at least one side of an integral web-form base. The base forms the means of attachment of the fastening member to the article that carries it.

Fastener members with fields of such hooks typically have a pleasing, uniform, commercially acceptable appearance and are widely found in consumer and industrial products.

In a preferred method of manufacture, molding rolls are used in the process shown e.g. in Fischer U.S. Pat. No. 4,794,028. This process produces hook fasteners of commercial appearance in which the rows of hooks are straight and the spacing between the hook elements in both directions is regular.

Mold rolls for forming preferred fastening members of this kind typically comprise a series of thin circular plates, with mold plates alternating with spacer plates. Peripheries of the individual molding plates are machined with cutouts to define small hook profile cavities. The group of plates is held so their peripheries cooperate to define the surface of the roll. Because a large number of such plates is required and the plates must be carefully held in alignment, such mold rolls have been expensive to produce and maintain and have typically been confined to short lengths. The width of the product produced has been correspondingly restricted.

Conventional fastener materials produced in this way have been less than one or two feet in width and have had a web thickness between the hooks greater than 0.005 inch, typically 0.008 inch or more. Typically, in this method of manufacture, the hooks face in the machine direction or in the opposite direction, with the consequence that their major peel and shear strengths have been similarly oriented.

Other advantages and features will be apparent from the following description and claims.

SUMMARY OF THE INVENTION

We have discovered that it is possible to achieve a commercially acceptable sheet-form fastener member of synthetic resin in which the web or base portion lying between the multitude of fastener elements exists in a laterally permanently stretched condition, in many instances the substance of the web having molecular orientation at least partially in the direction of lateral stretch.

We have found that, while preserving the identity and functional shape of integral discrete fastener elements, the web portions between neighboring fastener elements can be stretched to a uniform thickness across the width of the product. In desirable instances, the web portions between the fastener elements are reduced to film thicknesses, and the resulting fastener member is readily conformable about curved or complex surfaces or is otherwise usefully applied to broad areas in an economical manner.

According to one important aspect of the invention a method of producing a sheet-form fastener product comprises the steps of: (1) lengthwise stretching a sheet of heat-softened synthetic resin to pre-orient the molecular structure of the sheet in a longitudinal direction; (2) with a rotating mold roll, molding from the sheet a running web having a base and a multiplicity of discrete fastener elements integral with the base and protruding from at least one side of the base; and (3) thereafter, under conditions in which the web is permanently stretchable, stretching the web widthwise in a manner that permanently stretches the base and increases the widthwise spacing of the fastener elements.

In some particularly useful embodiments, the fastener elements comprise touch-fastener hooks or the like.

Advantageously, in preferred embodiments, the widthwise molecular orientation and peel strength of the fastener product are increased during the widthwise stretching process.

In the presently preferred configuration, the ratio of the final width of the product to the original width of the product before widthwise stretching is between about 2 to 1 and about 10 to 1, and the widthwise stretching reduces the thickness of the base of the web by at least 50%.

In certain configurations, the widthwise stretching widens the web by at least 200% and reduces the thickness of the base of the web between fastener elements by at least two thirds.

In another embodiment, the method also comprises heating the web to render the base of the web permanently stretchable without detrimental change in the shape of the fastener elements. In certain arrangements, the fastener elements protrude from only one side of the web and the web is heated predominantly from a side opposite the side having the fastener elements.

In some examples, the resin is a thermoplastic resin suitable for forming hooks, comprising polypropylene, polyethylene, polyester, polystyrene, PVC, nylon or copolymers or polymer blends thereof.

In certain advantageous configurations, the widthwise stretching process causes molecular orientation and strengthening of the base of the web between fastener elements as it is stretched, such that as a result the base of the web between fastener elements is stretched widthwise substantially uniformly throughout.

In certain situations in which the synthetic resin has a Characteristic Minimum Stretch Ratio, the mold roll defines fastener elements and other stretch-limiting features over the area of the web, according to a predetermined pattern. The pattern is selected such that the ratio of the width of the final web to the width of the web before widthwise stretching is substantially less than the Characteristic Minimum Stretch Ratio. In certain useful embodiments, the fastener elements and stretch-limiting features resist local stretching of the web. In some situations, the stretch-limiting features are physical features of the product formed of synthetic resin integral with the base of the web, with the method including the step of differentially heating the web being formed such that the fastener elements and the stretch-limiting features are rendered less stretchable than the base of the web.

In some configurations, the temperature of the web base is controlled as the web is stretched widthwise. For instance, the fastener elements may be immersed in a temperature-controlled liquid during the widthwise stretching. In other instances, the web base is immersed in a temperature-controlled liquid during the widthwise stretching, or the web base is heated in a heated liquid bath during the widthwise stretching while leaving the fastener elements exposed to air.

In some embodiments a dual stretch process is employed, in which the step of stretching the web widthwise includes stretching the web widthwise in a first stretch zone, maintaining the web at an intermediate, stretched width, and then further stretching the web widthwise in a second stretch zone. Preferably, the rate of widthwise stretching varies along the first stretch zone.

In another aspect of the invention, a method is provided for producing a sheet-form fastener product, comprising (1) forming from synthetic resin a running web having a multiplicity of rows of discrete fastener elements integral with and protruding from at least one side of base of the web, the elements facing in a substantially longitudinal direction, and (2) thereafter, under conditions in which the web is permanently stretchable, stretching the base of the web in a bias direction in a manner that permanently stretches the web base between fastener elements, increasing the spacing of the fastener elements and orienting the rows of fastener elements in a direction diagonal to the machine direction, such that the elements face in a diagonal direction.

In another aspect of the invention, a method of producing a laminated sheet-form product having fastener elements comprises (1) forming from synthetic resin a running web having a multiplicity of discrete fastener elements integral with a base of the web and protruding from one side of the web base in a pattern, (2) thereafter, under conditions in which the web base is permanently stretchable, stretching the web base widthwise to a wider width in a manner that permanently stretches the web base between fastener elements and increases the widthwise spacing of the fastener elements while substantially maintaining the longitudinal spacing of the fastener elements, and (3) bonding an added material to the oppositely directed side of the web base.

In some embodiments the bonding comprises passing the added material and web over a roller under conditions in which the web base is heat-softened.

In other embodiments, the bonding comprises applying an adhesive to either the added material, or the web base, or both, and directing the added material and web to join to form a laminate.

In yet other embodiments, the bonding comprises heat-softening a surface of the added material, and passing the added material and web over a roller such that the web base adheres to the heat-softened surface of the added material.

In the preferred arrangement, the bonding includes forcing the added material and web together such that the web base adheres to the heat-softened surface of the added material, sometimes by forcing the added material and web together against a roller by air pressure.

In another aspect of the invention, a method of producing a sheet-form fastener product comprises (1) forming from synthetic resin a running web having a multiplicity of discrete fastener elements integral with the web and protruding from at least one side of the web in a pattern, the forming causing the molecular structure of the web to be pre-oriented in a longitudinal direction, and (2) thereafter, under conditions in which the web is permanently stretchable, stretching the web widthwise in a manner that permanently stretches the web between fastener elements and increases the widthwise spacing of the fastener elements while substantially maintaining the longitudinal spacing of the fastener elements.

In another aspect of the invention, a fastener product is comprised of synthetic resin and has multiple rows of fastener elements oriented in a first direction along a web base. The web portions between the rows of elements have molecular orientation at a substantial angle to the first direction.

In a preferred arrangement, the fastener elements comprise hook elements with profiles set at a bias direction relative to the running length of the web.

In some cases the web base, in a stretched condition, comprises a thermoplastic film of thickness less than 0.003 inch. In certain cases, the product is adhered to a non-planar surface of a useful product, the film web conforming to the non-planar surface.

In some useful embodiments, the product has a width of eight feet or more.

In certain advantageous examples, the product has molecular orientation in the widthwise direction, providing tear resistance in the lengthwise direction. In certain key embodiments, the product also has molecular orientation in the lengthwise direction, providing tear resistance in the widthwise direction.

In another set of embodiments, a decorative covering comprises the product and a sheet material in a laminated state, the fastener elements of the product providing a means to secure the covering in a desired position. In some instances, the decorative covering comprises a wall covering. In other instances, it comprises a floor covering.

In another aspect of the invention, a machine for forming a fastener product has a pair of rolls forming a nip, at least one of the rolls being a mold roll for forming touch fastener elements integral with a side surface of a running length of a web base. The machine also includes means for supplying plastic resin to the nip, whereby the resin is longitudinally stretched before being molded, and a widthwise stretching device arranged to stretch the web base of an intermediate product produced by the pair of rolls in a direction transverse to the running length of the web base.

In the presently preferred embodiment, the machine includes a heating tunnel through which the intermediate product is passed prior to the stretching device. The heating tunnel is arranged to predominantly heat a side surface of the web base opposite to the side surface on which the fastening elements are disposed.

In a particularly useful embodiment, the means for supplying plastic resin comprises an extruder and the supplied resin is longitudinally stretched by tension caused by the driven rolls, thereby pre-orienting the molecular structure of the resin in the machine direction before forming.

In another configuration, the means for supplying plastic resin comprises an extruder positionable above the nip, and the supplied resin is longitudinally stretched at least partially by gravity forces as it falls from the extruder to the nip.

In another useful arrangement, the machine also includes means for laminating an added material to the stretched web base. In a preferred embodiment, the means for laminating includes a roller about which the product is trained in a stretched condition.

Another aspect of the invention is the use of certain materials and process conditions in the stretching methods described. Advantageously the resin used in the methods comprises a thermoplastic resin having a flex modulus of at least 150,000 pounds per square inch, preferably the thermoplastic resin comprising a material selected from the group consisting of PET, polypropylene, and copolymers of PET and polypropylene, and preferably, in applications requiring high fastener performance, the resin has a flex modulus of at least 250,000 pounds per square inch.

Preferably the thermoplastic resin has an intrinsic viscosity between about 0.6 and 1.1 deciliters per gram, and more preferably the resin has an intrinsic viscosity between about 0.8 and 1.0 deciliters per gram.

In important applications the thermoplastic resin is bottle grade PET, and in certain instances the PET is comprised at least in part of recycled resin.

It is advantageous that the resin comprise a thermoplastic resin having a glass transition temperature of at least 30 degrees Celsius.

Likewise, in cases in which the resin of the web is PET or copolymers thereof, the web is at a temperature between about 90° and 120° C. during stretching.

Another aspect of the invention features a fastener product comprised of synthetic resin and having multiple rows of fastener elements extending in a first direction along a running web base upon which the fastener elements are integrally molded, the web portions between the rows of elements having molecular orientation at an angle to the first direction as a result of the product having been stretched, after molding, to a width of at least twice its as-molded width.

Another aspect of the invention features a fastener product comprised of synthetic resin and having a multiplicity of rows of molded fastener elements extending along a running web base upon which the fastener elements are integrally molded, the web base between the rows of elements having a degree of molecular orientation in a first direction as a result of being stretched prior to molding, and a degree of molecular orientation in a second direction, perpendicular to the first direction, as a result of being permanently stretched after molding.

Products according to these aspects have one or more of the following features.

The resin comprises a thermoplastic resin having a flex modulus of at least 150,000 pounds per square inch.

The resin comprises an element selected from the group consisting of PET, polypropylene, and copolymers thereof.

The resin comprises a thermoplastic resin having a flex modulus of at least 250,000 pounds per square inch.

The resin comprises a thermoplastic resin having a glass transition temperature of at least 30 degrees Celsius.

BRIEF DESCRIPTION OF THE DRAWINGS

FIG. 1 is a side view and FIG. 2 is a plan view of an apparatus for producing a product according to the invention.

FIGS. 5a and 6a are cross-sectional views taken along respective lines in FIG. 4a.

FIG. 7 is a side view and FIG. 8 an end view of the highly magnified fastener element of FIGS. 5b and 5c, illustrating the change in section dimensions of the product during stretching.

FIGS. 7a–7d illustrate some of the many types of fastener elements that may be employed.

FIG. 14 is a view similar to the left-hand portion of FIG. 1 in which a coextrusion extruder supplies the nip with a molten resin of two different compositions.

FIG. 14a is a cross-sectional view of a product made with the process and machine of FIG. 14.

FIG. 15 is a view similar to that of the left-hand portion of FIG. 1 incorporating multiple mold rolls for forming a product having projections on both sides, providing for multiple resins for constituting the product.

FIG. 15a is a cross-sectional view of a product formed employing the apparatus and method illustrated in FIG. 15.

FIG. 16 illustrates the use of radiant heating in a preheating oven prior to lateral stretching.

FIG. 17 shows a version of the machine of FIG. 1 that laminates a backing material to the stretched web.

FIGS. 18–20 illustrate additional lamination adhesion techniques.

DETAILED DESCRIPTION OF EMBODIMENTS

Figure 1A:
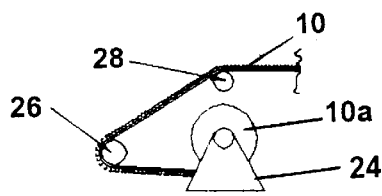
FIG. 1a is an alternate source for the web that can be stretched in the system of FIGS. 1 and 2.

Referring to FIGS. 1 and 2, a forming device 12 is shown which employs a rotating mold roll 14 for molding from synthetic resin a product 10, a running web, having a multiplicity of discrete spaced-apart fastener elements integral with the base web. As depicted in FIG. 1, the mold roll 14 is associated with a pressure roll 16 to define a forming nip. The mold roll has discrete mold cavities about its perimeter, each shaped to form a fastener element profile, for instance that shown greatly magnified in FIGS. 7 and 8. An extruder 18 extrudes molten plastic resin 20 which enters the nip and is formed into a web with a large multiplicity of the discrete fastener elements extending from one surface. After passing about takeoff roller 22 the formed product 10 is available to be passed through the stretching apparatus shown in FIGS. 1 and 2.

Alternatively, instead of passing the product 10 from the forming device 12 directly to the stretching system as shown in FIGS. 1 and 2, the product may be accumulated in a storage roll and at another time it may be dispensed from the storage roll to the stretching system. FIG. 1a shows a stand 24 mounting a storage roll 10a of material formed previously by forming device 12. The material passes about idlers 26 and 28 and is supplied to the stretching system of FIGS. 1 and 2 to proceed as a batch process rather than as the in-line process shown in FIG. 1.

In either process, the product 10 enters a stretching system comprising a preheater 32, a lateral stretching mechanism 40, and cooling unit 50. The completed product can then be wound into a roll or otherwise processed.

Figure 3:
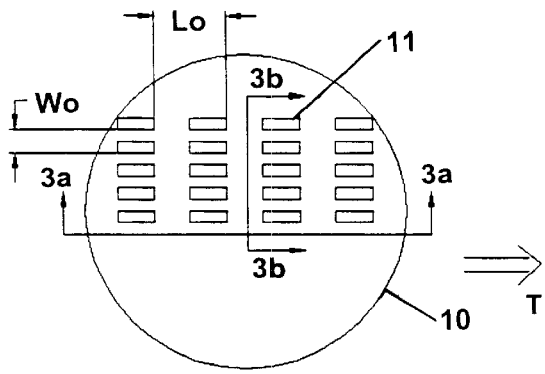
FIG. 3 is a magnified plan view of the product prior to widthwise stretching, taken on line 3—3 of FIG. 1.

Referring also to the magnified product view of FIG. 3, the upper surface of the web 12 has a great number of discrete upstanding hook elements 11, in this case suitable for fastening according to the hook and loop technique. Alternate rows of the hooks may face in opposite directions, the rows of hooks being aligned with the machine direction T, corresponding to the direction in which the molding roll 14 turns.

Prior to entering the preheater 32, the product is engaged by clamps 30 of the tenter frame which travel on rails along with the product, thus conveying the molded product through the preheater 32, and the lateral stretching unit 40.

As shown, the downwardly facing, smooth surface of the web 10 of the product is exposed to distributed currents of hot air that are generated by hot air source 34 and introduced to the preheater through plenum 36 and distribution nozzles 38.

The upper surface of web 10 and discrete fastening elements 11 are exposed to residual air currents at cooler temperature contained by the walls of the preheater 32. As a result, the majority of the heat is controllably introduced through the lower surface of the product and the fastener elements 11 on the upper side are kept at a temperature sufficiently low that no detrimental deformation of the fastener elements occurs during the preheating and stretching processes.

The product 10 in preheater 32 is heated typically to a controlled temperature above the glass transition temperature of the synthetic resin of which the product has been formed, but below its melting temperature. Due to the predetermined layout of the guide rails, the tenter frame clamps 30 maintain a constant widthwise spacing corresponding substantially to the formed width of product 10, up to the final stage of the preheater 32. At this point the clamps 30 begin to diverge, in accordance with known tenter frame techniques. The clamps diverge in the stretching unit 40 until the maximum width is achieved, as shown substantially midway in the stretching unit, after which the tenter frame rails may proceed in parallel for a selected distance and then gradually converge to the stabilized final width W. The product passes through the cooling unit, 50 with width W where the material is cooled and stabilized.

Figure 4:
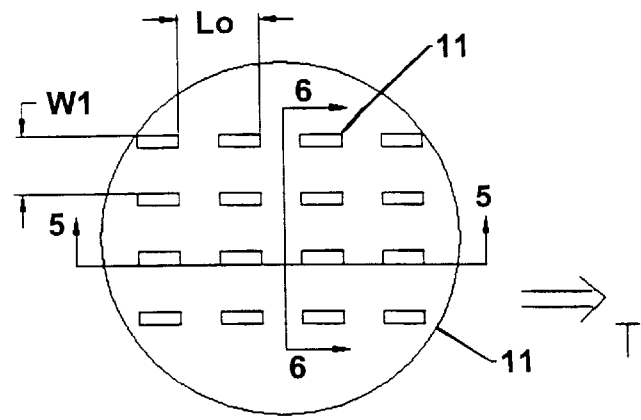
FIG. 4 is a magnified plan view of the completed product, taken on line 4—4 of FIG. 1.

Referring also to FIG. 4, the result of passing of the product through the preheater 32, stretching unit 40 and cooling unit 50 is that the web is permanently stretched widthwise, and the spacing between the rows of discrete fastener elements 11 is increased according to a predetermined stretching ratio. This ratio is selected to be in excess of the Characteristic Minimum Stretching Ratio of the resin, as explained more fully below. In comparing the before and after magnified views of the product, FIGS. 3 and 4, it is seen that the initial spacing $w_0$ of the rows of the fastener elements 11, FIG. 3, has increased to spacing $w_1$, FIG. 4, which is significantly larger than $w_0$. Depending upon the desired product, the characteristics of the resin being processed, and other parameters, the change in spacing, $W_1$ may be selected to be between about 2 and 8 times the original width $w_0$. Because the grippers 30 of the tenter frame move at a velocity $V_1$ that is substantially constant throughout the stretching system in this embodiment, no significant change is produced in the lengthwise spacing of the discrete hook elements in the machine direction of travel, T, as indicated by the same dimension $1_o$ in FIGS. 3 and 4.

Figure 21:
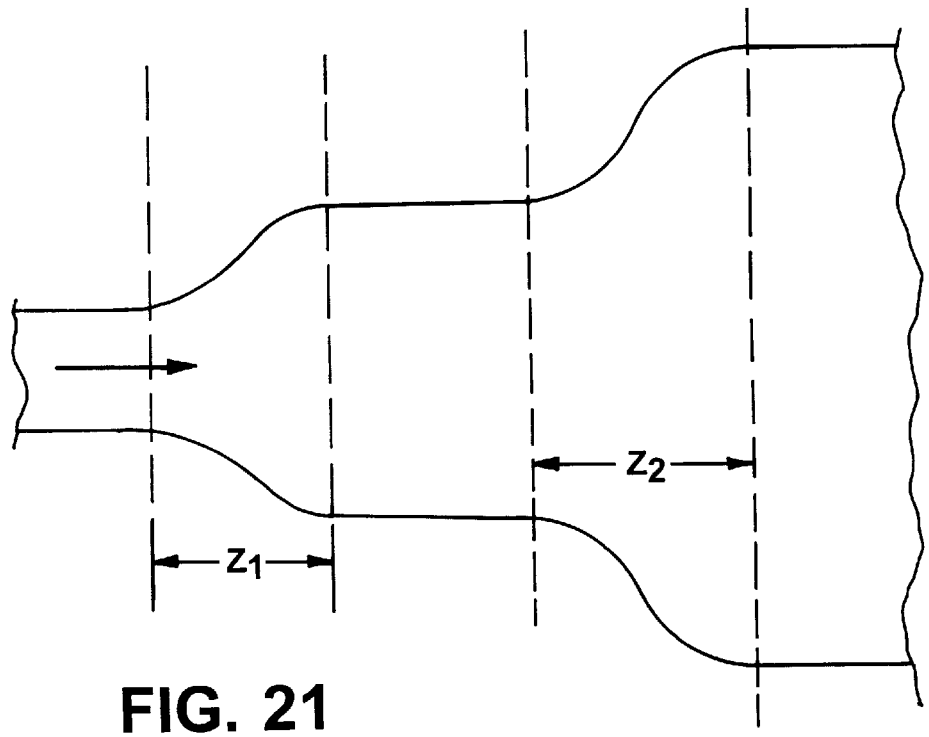
FIG. 21 illustrates dual speed zone stretching.

In certain instances the widthwise stretching is performed in two or more distinct zones, as shown in FIG. 21. In the first zone $Z_1$ the product is stretched in a widthwise direction to an overall stretch ratio of about 2.5:1, after which it is maintained at an intermediate width for at least a few seconds to achieve partial stabilization before undergoing a second widthwise stretch in zone $Z_2$ to a final overall stretch ratio of about 6:1. As illustrated, the tenter frame rails in the stretch zones follow curves (e.g., cosines) configured to gradually initiate and culminate the widthwise acceleration of each stretch cycle. The first stretch cycle establishes the desired molecular orientation of the web base. This dual speed zone stretching arrangement may enable larger final stretch ratios to be achieved with sensitive web resins while avoiding tearing caused in part by process-induced stress concentrations at the bases of the hooks.

Figure 3A:
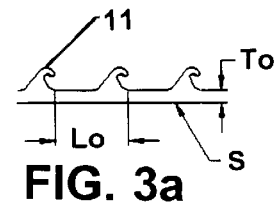
FIGS. 3a and 3b are cross sectional views taken along lines 3a—3a and 3b—3b, respectively of FIG. 3.
Figure 3B:
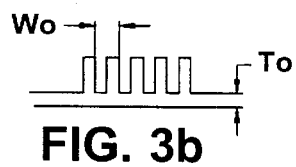
Figure 5:
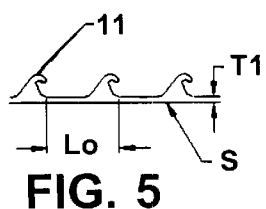
FIGS. 5 and 6 are cross-sectional views of the completed product taken along respective lines in FIG. 4.
Figure 6:
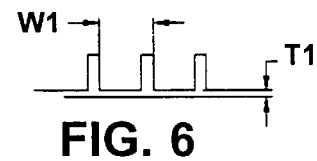
Figure 5A:
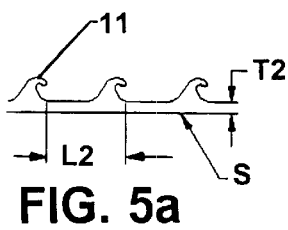
Figure 5B:
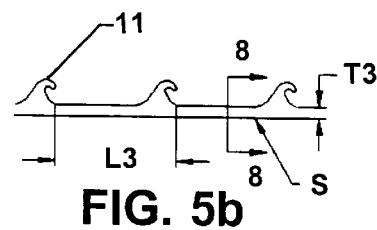
FIGS. 5b and 6b are cross-sectional views taken on respective lines in FIG. 4b.
Figure 6A:
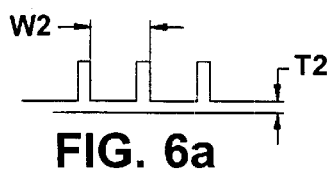
Figure 6B:
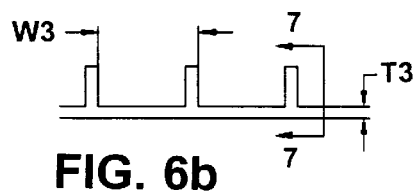

Being thus subjected to lateral stretching conditions, the material of the base web 12 significantly decreases in thickness from the original thickness $t_0$ of FIGS. 3A and 3B to the reduced thickness $t_1$ of FIGS. 5 and 6. The areal density of the fastener elements is accordingly reduced. For example, with hook form elements of a type having a conventional height of about 0.035 inch and a spacing $1_o$ of about 0.050 inch along the rows, starting with a spacing $w_o$ of the rows of about 0.025 inch and ending with a spacing $w_1$ of FIG. 4 of about 0.100 inch, the areal density changes by a factor of 4, from about 800 fastener elements 11 per square inch to about 200 fastener elements per square inch. In cases where a greater final area density of the hook elements is desired, e.g. for greater peel or shear strength of engagement of the hook form fastener elements 11 with a loop fabric, one can readily make adjustments, for instance by decreasing the original widthwise row spacing $w_0$, or by decreasing the stretching ratio.

In another example employing smaller discrete fastener elements, the area density may change e.g. from about 2000 to about 1000 or 500 per square inch. Numerous different fastener element profiles may be employed with different area densities.

The transverse stretching is performed with the material of the web at least partially amorphous, at a temperature above its glass transition temperature ($T_g$) and below its melting temperature, under conditions in which it has sufficient strength to be stretched. Preferably, the web material is subjected to stretching while at a temperature lower than the temperature at which it experiences its maximum crystallization rate ($T_c$). Preferably, just prior to being transversely stretched, the web is of no more than about 30% (by weight) crystalline phase, as may be determined by comparing the density of the web to known densities of the material in its amorphous and crystalline phases. By limiting the initial crystalline content the web is amenable to considerable stretching. The stretching action itself adds to the degree of crystallinity of the web.

The stretching process is thus conducted under conditions in which the base web 12 is permanently stretchable the desired amount and the stretching of the web is conducted in the manner that permanently stretches the web 12 and results in increasing the spacing of the fastener elements 11 of the product 10. Numerous other arrangements can be employed, a few of which will be described later in this description.

In the preferred embodiment shown in FIGS. 1 and 2, the web is rendered permanently stretchable by the application of heat. By use of heated air and avoiding introducing the hot air to the top surface of the web 12, which in this case carries the integral molded fastener elements, the fastener elements 11 are protected from the heating conditions to which the under surface and body of the web are subjected. Under these conditions, stretching the web 12 is found not to deleteriously affect the profile of the fastener hooks 11. The amount of divergence of the grippers 30 of the tenter frame and the final dimension W to which the web is stretched is varied according to the resin employed and the desired characteristics of the final product.

Typically a given resin material as a flat sheet, under given stretching conditions, has a Characteristic Minimum Stretch Ratio (CMSR) defined by the condition that, if the sheet is not stretched beyond that minimum ratio, a nonuniform product results, with ripples and dents. If the CMSR is exceeded, stretching of all areas can be assured, and a substantially flat final product can be achieved. This parameter is determined from the manner in which stretching, at the microscopic level, occurs. In general it reflects the fact that molecular orientation occurs during the stretching that increases the strength of the region of the sheet where the orientation has occurred. Considering the stretching action microscopically and over very short time intervals, the sheet is never precisely of uniform thickness or heated to a precisely uniform temperature and stretchability throughout. This affects the way the process proceeds. In the initial stages of the process, the stretching occurs in the most stretchable regions until by progressive molecular orientation in those regions, those regions of the sheet become stronger and more resistant to stretching. As this occurs, the stretching action shifts to previously unstretched regions, and so on. This creates a uniform stretching effect if stretching occurs over a sufficient length of time and the CMSR is substantially exceeded, by which all regions of the sheet experience some stretching sufficient that a flat, uniformly appearing product is achieved.

For applications requiring good dimensional stability and low elasticity in use, thermoplastic resins having a glass transition temperature $T_g$ greater than about 30 degrees Celsius are preferred. For other applications, where cost or compatibility considerations are paramount, materials with lower glass transition temperatures may be employed, even those with a $T_g$ below room temperature.

Along these lines, we have found that particularly useful thermoplastic resin materials are polyethylene terephthalate (PET), polypropylene, and their copolymers.

Polypropylene has a $T_g$ of only about −10 degrees Celsius, and care must be taken to avoid excessively high crystallization prior to stretching. However, it is preferred in some applications, such as in some diaper fasteners, because it is capable of being welded to polypropylene diaper liners and is also presently very inexpensive. Polypropylenes with a flex modulus of above about 150,000 psi are preferred, with 170,000 psi polypropylenes being presently more preferred. An example of a useful polypropylene copolymer is PROFAX 7823, available from Montell, which is a copolymer of polypropylene and ethylene.

To provide sufficient hook strength for an important range of applications, the resin is selected to have a flex modulus of at least 150,000 psi. For many applications, e.g. where there are low transverse hook densities after stretching, materials having a flex modulus of at least 250,000 psi are preferred.

For forming fastener element hooks and other formations we presently prefer materials having an intrinsic viscosity (IV) of between about 0.6 and 1.1 deciliters per gram, more preferably between about 0.8 and 1.0 deciliters per gram, to achieve needed performance and optimize processability.

PET typically has a $T_g$ of about 75 degrees Celsius, a $T_c$ of between about 130 and 160 degrees Celsius, and a melting temperature $T_m$ of about 255 degrees Celsius. In the presently preferred PET process, the web is heated to a temperature of between about 90 and 110 degrees Celsius just prior to transverse stretching. The flex modulus of PET ranges from about 350,000 to 450,000 psi. PET can provide good mechanical properties (as an engineering resin) at a reasonable cost, given its current widespread use. Under certain circumstances, recycled resin, such as recycled soft drink bottles, may be used. An example of a useful PET material is 9921, available from Eastman. Suitable PET copolymers include, for example, PETG, PCTA, PCT and PCTG. PET homopolymer is obtained by condensation of terephthalic acid and ethylene glycol. Many copolyesters are available, obtained by substituting, in different percentage levels, the acid or the alcohol above by another acid or another alcohol. Examples (list not exhaustive):

PETG, where CHDM (cyclohexanedimethanol) glycol and ethylene glycol are combined with terephthalic acid; PCTA, where terephthalic acid and another unidentified acid are combined with CHDM; PCT, (in fact a homopolymer), where CHDM is combined with terephthalic acid; PCTG, a copolymer, essentially a PCT modified with ethylene glycol.

Modified 9921 PET resin (9921 plus mold release plus reactor colorant can be used to advantage).

The amount of transverse stretching after molding should be selected to maintain a transverse hook density sufficient for the intended application. The machine direction hook density need not be appreciably affected by the post-molding operations, and may even be increased in some cases while the product is transversely stretched, such that a good machine hook density is maintained. However, because transverse hook density is decreased by the post-molding stretching process, providing sufficient fastener peel and shear strengths per unit area may limit, for some applications, the maximum practical stretch ratio achievable after molding. Using PET, for example, the transverse stretching may be limited to result in a product of 2 to 7 times (preferably, 3 to 4 times) the width of the product as it is removed from the mold roll.

The amount the product may be stretched transversely after molding also depends upon the degree of longitudinal (i.e, machine direction) pre-orientation of the molecules of the web prior to molding. A high degree of longitudinal pre-orientation enables more transverse stretching, as there are fewer unstretchable molecules oriented in the transverse direction. As explained above, such a longitudinal pre-orientation may be achieved, for example, by stretching an extruded sheet of resin in the longitudinal direction prior to molding.

In the embodiment of FIGS. 1 and 2, the longitudinal speed $V_1$ of the tentering frame clamps 30 is maintained substantially constant throughout the length of travel from preheater through the cooling unit.

Figure 4A:
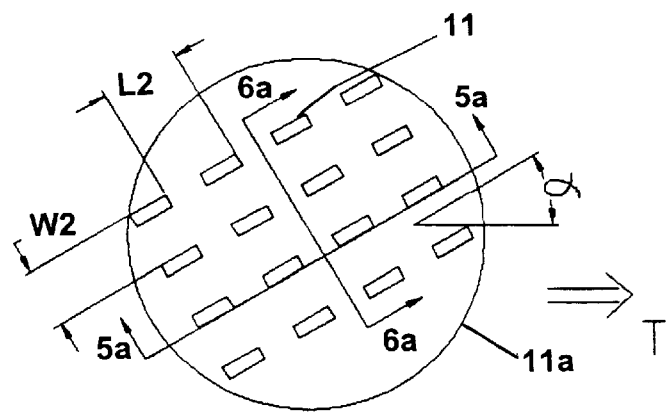
FIG. 4a is a magnified plan view of a completed fastener product in which the fastener elements are disposed at a bias angle relative to the machine direction.
Figure 11:
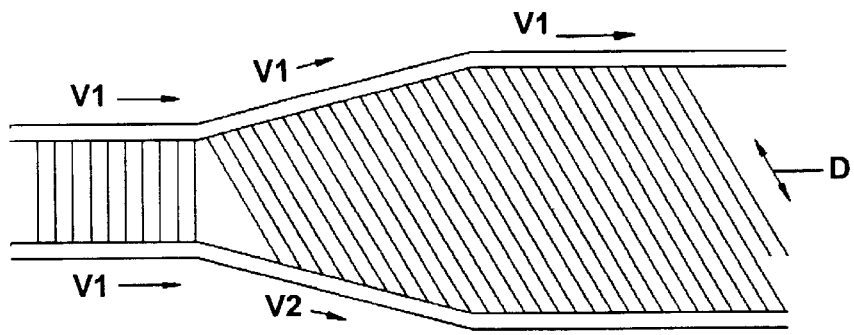
FIG. 11 is a diagrammatic plan view of a tenter frame constructed to effect stretching of the product in a bias direction.

Referring to FIG. 4a and to the diagrammatic representation of the tenter frame grippers in FIG. 11, in an alternative process the grippers along one edge of the product travel at velocity $V_1$ throughout the preheater 32 and stretching unit 40 as depicted. However, along the other edge of the product, the gripper chain is divided into two effective sections. The first section passing through the preheater 32 travels at velocity $V_1$, the same as the velocity on the opposite edge. In the second section, within the stretching unit 40, the longitudinal speed of the grippers is smoothly increased to a velocity $V_2$ which is faster than velocity $V_1$. This has the effect of applying stretching forces to the web material in the diagonal or bias direction as suggested by arrow D in FIG. 11 and results in a reorientation of the rows of fasteners to the relationship depicted in FIG. 4a. The rows of fastener elements form an angle a relative to the machine direction of travel, T. In this case the material of the base web 12 has molecular orientation set in the bias direction, due to the diagonal stretching, corresponding to the direction of the reoriented rows of fasteners. Prestretching in the machine direction is not required in this case, but may be employed. As a component of their profile now lies in the lateral, or cross-machine direction, the fasteners in the diagonally-stretched product may provide a more effective hook and loop fastening relative to peel and shear, in the lateral direction, than do the equivalent fasteners if processed to produce the product of FIG. 4.

Due to the arrangement of the resin extruder 18, mold and pressure rolls 14 and 16, and the included nip, the extruded resin is pulled, or stretched longitudinally, as it enters the nip, thereby pre-orienting the molecular chains of the resin of the base web 12 in a longitudinal direction, parallel to the rows of fastener elements 11 before being molded. Typically the amount of longitudinal pre-orientation increases with the speed of the extrusion and molding process. This pre-orientation of the web advantageously strengthens the web in a longitudinal direction, and can decrease the longitudinal tear resistance for applications that entail subsequent splitting operations. The use of special dies in the extruder 18, such as coat hanger dies, can enhance this longitudinal pre-orientation, as can gravitational feed system in which the extruded web of molten resin longitudinally stretches under inertial forces as it falls into the nip.

Figure 4B:
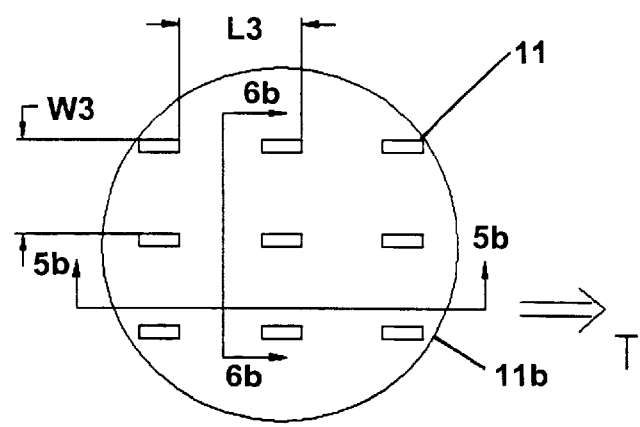
FIG. 4b is a magnified plan view of a completed product which has been stretched both widthwise and lengthwise.
Figure 12:
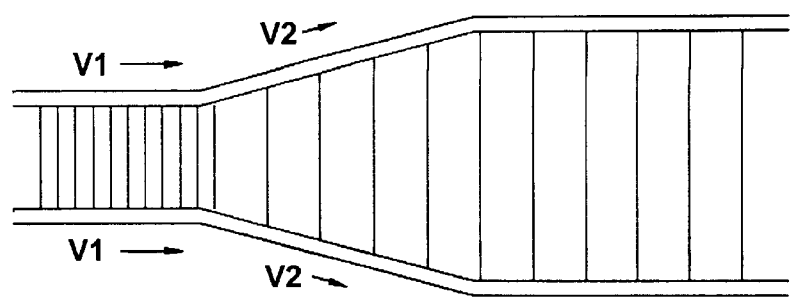
FIG. 12 is a view similar to FIG. 11 of a tenter frame producing simultaneous widthwise and lengthwise stretch to bias the orientation of the fastener elements.

In machines with extruder arrangements which do not advantageously longitudinally pre-orient the web as it enters the nip, a tenter frame arranged as illustrated in FIG. 12 can be employed to stretch the molded web longitudinally as well as transversely, to create the product shown in FIG. 4b. In this case the clamps on both sides of the stretching apparatus are divided into two sections. The first section on each side travels at the velocity $V_1$ through the preheater 32, and the second section of the clamps travels at greater velocity $V_2$ as the web is pulled through the tenter frame 40. This has the effect of stretching the web longitudinally simultaneously as the web is stretched widthwise, resulting in biaxial resin orientation of the substance of the web and increasing the spacing of the hook form fastening elements to width $w_3$ and length $l_3$, respectively larger than the original values $w_0$ and $l_0$ as depicted in FIG. 3. One detriment of this particular method is that post-stretching in a machine direction limits the amount of transverse stretching that can be applied to a molded web, thereby limiting the achievable width of the final product.

Figure 4D:
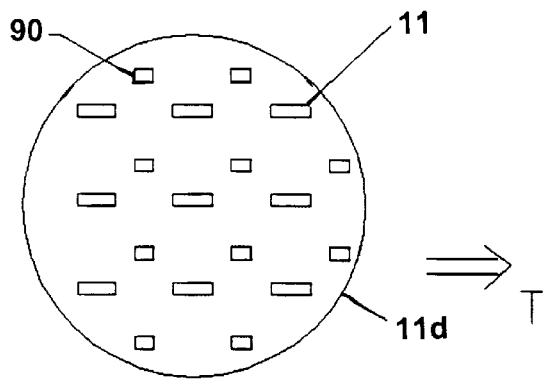
FIG. 4d is a magnified view of a product having additional stretch limiting formations.
Figure 4C:
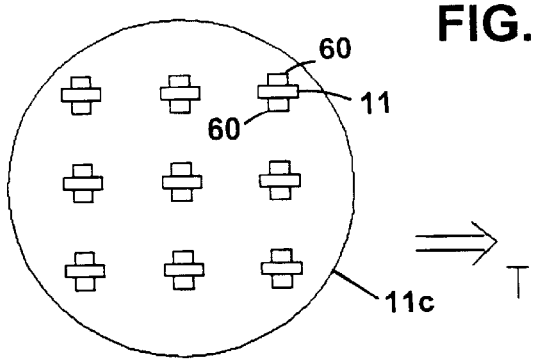
FIG. 4c is a magnified view of a completed product having differently shaped fastener elements.

FIG. 4c illustrates another product producible by the method of the invention in which, in addition to the discrete fastener hooks 11, further formations 60 connected to the hooks serve a reinforcing function with respect to the overall performance of the product. The post-forming widthwise stretching process is effective for such products.

In FIG. 4d, surface formations 90 are set in a pattern predetermined to limit the stretchability of the overall product when it is heated. In this case the hook form fastener elements 11 and the further stretch limiting formations 90 are for instance kept relatively cool and cooperate to limit the stretchability of the overall preform. By appropriate selection, the fastener elements 11 and additional formations 90 can provide for a specific product design, and under selected process conditions, an effective minimum stretch ratio that is substantially less than the CMSR for a plain, flat sheet of the same thickness as the web 12 of the product in question. In this manner the preform is fashioned to behave in the tenter frame in a manner different from that dictated directly by the CMSR of a plain web of the resin. By suitable choice of the size and location of the formations and hook elements, it is found possible to regulate the effective CMSR for the preform, and thus be able to vary the amount of stretching that can be achieved. This enables production of fastener products having different properties as desired. In the case of polypropylene, the CMSR is typically between about 6 to 1 to 8 to 1. However, by suitable selection of the area density, spacing and size of the hook elements 11 and the area density spacing and size of additional stretch limiting formations 90, and their relationship to one another, the effective CMSR for products may be variable over a considerable useful range, for instance down to 4 to 1 or 2 to 1. This may enable, by suitable selection of the parameters, forming products of numerous expansion ratios using the same resin, especially such resins as polypropylene.

Figure 27:
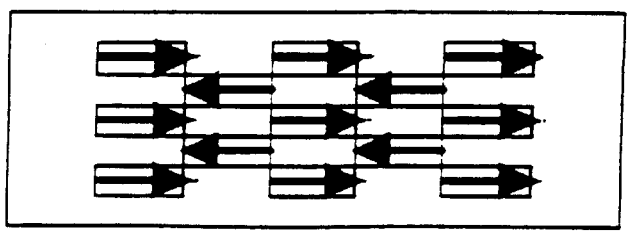
FIG. 27 illustrates an alternative hook mold pattern.

Final product hook densities may be increased by increasing the "as molded" hook density above, particularly by employing a checkerboard hook mold pattern as illustrated in FIG. 27. Arrows indicate the direction each hook is facing. As shown, the machine direction rows of hooks are molded with essentially no space between them. This pattern may be molded with a mold roll having no spacer plates between rotationally offset mold plates, for example. Such patterns would not, in many circumstances, provide acceptable performance as a fastener hook component due to the closeness of the adjacent rows, but as a preform that is subsequently stretched, the stretching action separates the rows and provides sufficient clearance around individual hooks to enable the hooks to penetrate a mating loop material. Thus, for example, the product may be molded with twice the hook density as is typically employed, subsequently stretched to twice its original width, and provide a product with an advantageously thin base and great width (and therefore higher yield and lower material cost), and yet the same hook density (and corresponding holding strength) as a comparable product as currently produced. Hooks of adjacent rows may face in opposite directions, as shown, or the hooks may face in a common direction. Other patterns and fastener element shapes may be employed, as may fastener elements extending in directions other than the machine direction.

FIGS. 7a–7d illustrate some of the many other types of fastener elements that can be employed. The micro hook of FIGS. 7a and 7b, have a characteristic height from about 0.030 inch down to 0.015 inch or less. These are useful for fine matching loop fabrics, including low loft nonwoven fabrics. The fastener element of FIG. 7c is of palm tree shape, and can have a height of about 0.100 inch, useful, e.g., for fastening upholstery fabrics to form creases and the like. FIG. 7d illustrates a mushroom-profile fastener element adapted to mesh with an array of similar mushroom fastener elements of an opposed fabric. This is given as just one example to show, that in its broader aspects, the invention is applicable to molded fastener elements of other forms. These are just four of the many hook profiles suitable for hook and loop fastening which can be employed advantageously in products produced in accordance with the invention.

Referring to the highly magnified views of FIGS. 7 and 8, the dashed line portions of the figures denote the originally molded product 10 as it leaves the forming device 13. The effect of the heat and stretching reduces the thickness of the web 12 as shown by the solid lines. The widthwise stretching can reduce the thickness of the web significantly, depending upon the stretching ratio.

Advantageously, in certain instances, the web is reduced to film thickness, i.e., less than 0.003 inch thickness, for thick film, or between about 0.001 inch and 0.002 inch thickness for relatively thin film. Such films have substantial conformability to complex surfaces. In some cases conformability alone is sufficient to enable smooth application to curved surfaces such as cylinders, or to be thermoformed. In other instances, the final thickness of the web, and the synthetic resin of which it is molded, are selected to impart stretchiness to the overall product to enable it to be stretched about complex surfaces.

Advantageously, in some instances, the product is bonded to the surface of an article that adds strength to the overall fastener member. Bonding may be by use of the adhesive quality of the back of the resin web itself, when heated as by flash heating, or by application of a layer of bonding agent, or by the adhesive quality of the surfaces to which it is applied, or by respective combination of any two or three of these, or by other bonding or adhering techniques, including ultrasonic welding or the like.

Figure 9:
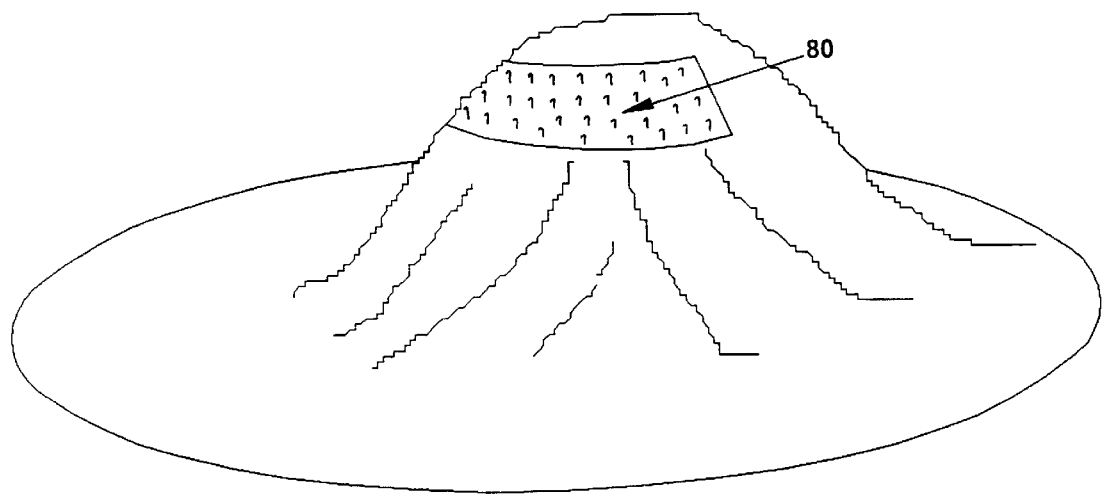

In FIG. 9 is shown a complex surface to which has been conformed a fastener member 80 produced according to the invention in which the thickness of the base web of the product has been reduced to a selected thickness in the range of 0.001 to 0.002 inch. The film-like nature of the web in this product renders it conformable and, where desired, stretchable, so that it conforms to the complex surface. In FIG. 9 the shape is arbitrary to illustrate the fact that numerous shapes can receive such a fastener member.

Figure 10:
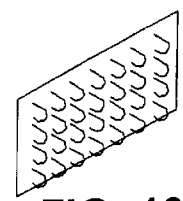
FIGS. 9 and 10 are side views of objects to which a fastening member according to the invention has been secured.

In the diagrammatic view of FIG. 10, a wide surface is illustrated, for instance an interior surface of an office partition, e.g. of 5 feet by 7 feet dimensions, to which a sheet of the material formed according to the invention has been adhered. The material provides a uniformly covered array of hooks over the entire surface as desired. A surface such as this can receive a loop member at any point and hold it securely. In this manner, partition walls of contrasting colors may be joined; signs and art work may be mounted on walls, ceiling tiles may be affixed, floor coverings may be secured, etc., all at relatively low cost.

Referring back to FIGS. 7 and 8, it is shown by the dashed lines that the height of the hook fastener element prior to heating was greater than after being subjected to the heating and stretching process. Depending upon the controlled amount of heat applied in the preheater 32 to the fastener elements, a certain amount of superficial flow of material from the fastener element may occur to effect shortening, due to controlled surface melting combined with gravity and surface tension effects. This can give the outer surface of the array of hook fasteners a desired effect, e.g., a softer and more pleasant surface "feel" for contact with the skin, for cases where such contact may occur.

In other instances, where it is wished to preserve the precise molded shape of the fastener elements 11, change to the profile can be avoided by reducing the heat applied or protecting the fastener elements while the web 12 is being heated. In this case the tension forces, applied to the web during stretching, extend into the relatively cool protruding fasteners element structure and effectively pull these relatively rigid structures into the relatively softer web material.

Figure 22:
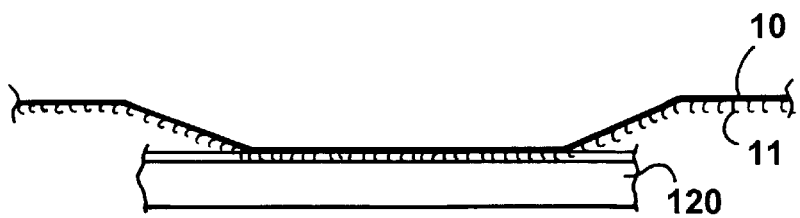
FIGS. 22–23 are side and plan views, respectively, of a liquid bath for maintaining the temperature of the fastener elements during stretching of the web.
Figure 23:
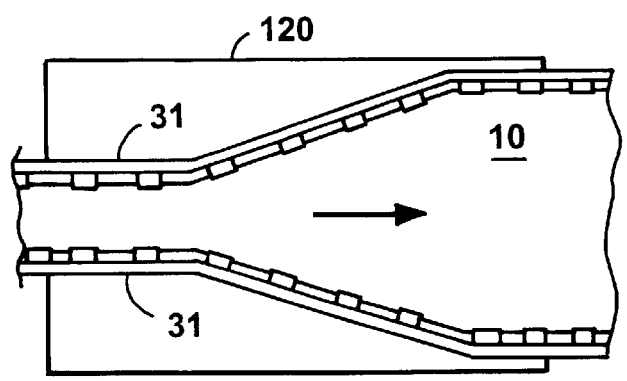

As shown in FIGS. 22 and 23, one method of protecting the fastener elements during stretching employs a shallow, temperature-controlled liquid bath 120. In this instance, only the fastener elements 11 are submerged in the bath during widthwise stretching, with the web base 10 exposed to an air environment of a higher temperature than the bath. The tenter frame rails 31 are arranged to lower the web to submerge the fastener elements during stretching, and to lift the product from the bath after stretching.

Figure 24:
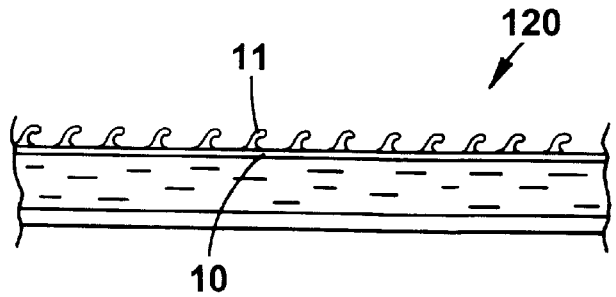
FIG. 24 illustrates heating the web base in a liquid while exposing the fastener elements to air during stretching.
Figure 25:
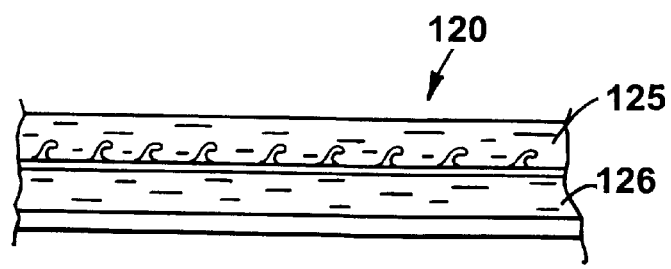
FIG. 25 illustrates a dual-liquid temperature control stretch bath.
Figure 26:
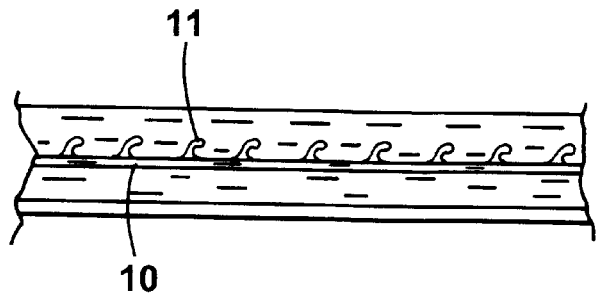
FIG. 26 shows the fastener product being stretched while controlling the temperature of both the web and fastener elements in a single fluid medium.

In another configuration illustrated in FIG. 24, the lower surface of the web base 10 is submerged into a heated, temperature-controlled bath while the fastener elements 11 are exposed to cooler air. In yet another configuration (FIG. 25), two non-mixing liquids 125 and 126 are employed and maintained at separate temperatures with the web base running along the interface between the two liquids acting as a thermal barrier to reduce heat transfer between the layers. In each of the above configurations, the bath is employed to more precisely control the temperature of the web base separate from the temperature of the fastener elements so as to help to maintain a desired fastener element shape as the web is stretched. The liquid bath may be arranged such that the fastener product is either suspended in the liquid or supported by the lower surface of the bath. In the configuration shown in FIG. 26, the entire fastener product (i.e., the web base 10 and the fastener elements 11) is submerged in a temperature-controlled fluid (either bath liquid or oven air) to control the temperature of the product during stretching. Useful bath liquids include glycol, for instance.

An aspect of the invention is the discovery that the tension effect between the base and fasteners is controllable, does not prevent the stretching of products having discrete, small fasteners elements, and in fact, in certain instances, can be used to advantage to achieve a desired shortening or change of geometry to the fastener elements.

Many of the foregoing embodiments have dealt with a fastener element having a single constituent resin of which the fastener elements 11 and the base portions 12 are integrally formed. Other constructions likewise take advantage of the invention, and in some instances provide further improved results.

Figure 13:
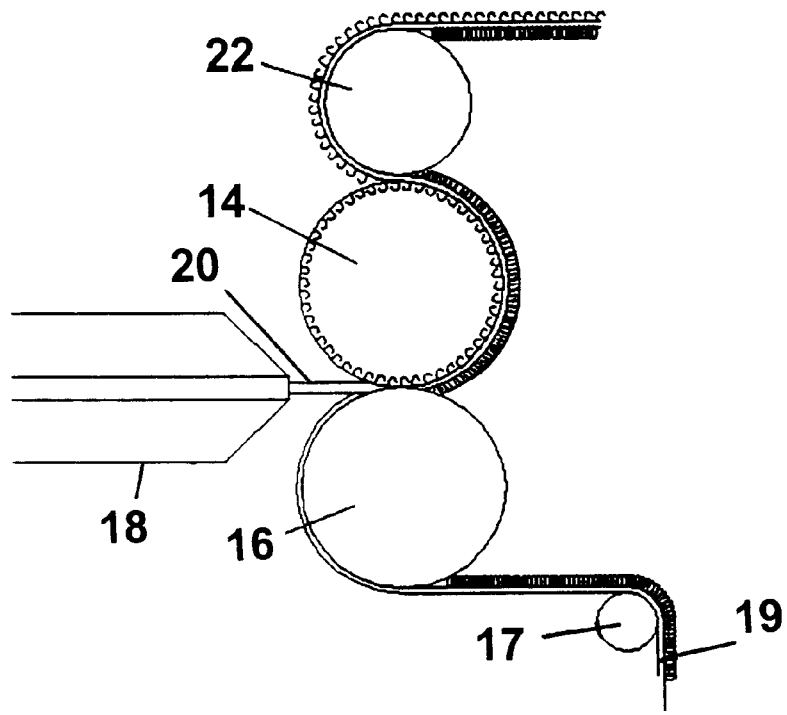
FIG. 13 is a view similar to the left-hand portion of FIG. 1, having the addition of means to introduce a preformed fabric to the back of the web.
Figure 13A:
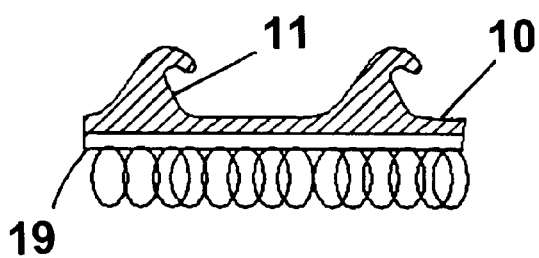
FIG. 13a is a cross-sectional view of a product formed employing the apparatus and method illustrated in FIG. 13.

Referring now to FIG. 13, the forming system is as shown in FIG. 1 with the addition of a wide roller 17 arranged to draw a preformed web 19 from a source not shown and supply it to the surface of the lower roll 16 preceding the nip. The material 19 comprises a knitted product which has been precompressed, for instance by a process known as microcreping, available from Micrex Corporation, Walpole, Mass. The knitted fabric is suitable for engagement with the hooks formed by the apparatus, and is capable of undergoing widthwise stretch without tending to shorten longitudinally. It is introduced to the surface of the roll 16 prior to the nip, and is combined with the resin 20 in accordance with the concept disclosed in U.S. Pat. No. 5,260,015, which is, in its entirety, hereby incorporated by reference. The resulting material is shown in the magnified view of FIG. 13*a*. The hook elements 11 are, as before, integrally formed with the base web 12, but the underside of the web is commingled and intimately joined with fibers of the compacted knitted fabric 19 to form a integral product. In one example the knitted product 19 is formed of fibers having a higher melt and glass transition temperature than that of the resin forming the web 12 and hook elements 11 such that the knit readily retains its looped construction under the heating conditions of the oven preheater 32 of FIGS. 1 and 2. Thus, as the hot air currents from hot air source 34 of FIG. 2 permeate the porous knitted fabric and contact the resin, the knitted structure remains intact and in fact serves as a heat sink to ensure the transfer of heat to the web 12 and provide for its stretchability when the product reaches the stretching region of the system.

In this manner a product having touch fastener hooks on one side and touch fastener loops on the other side is produced, having a finished width which is significantly greater than the width of the product as it leaves the mold roll 14.

Referring to FIG. 14 a further embodiment employs the roll setup as shown in FIGS. 1 and 2. However, the extruder 18*a* is a coextrusion extruder and produces streams of resin 21 and 23 of different properties. Prior to reaching the outlet of the extruder the streams 21 and 23 are merged and the combined extrudate 20*a* is fed into the nip of the mold roll and the pressure roll 16 as a layered composite of the two resins. The resin 23 may have a lesser thickness than resin 21, resin 23 being selected to form principally the fastening elements 11 while the resin 21 forms principally the web 12'. By employing compatible resins which have different Theological qualities, some advantages are obtained in the later stretching process. As an example it is advantageous to select the resin 23 to have a higher melting point and a higher glass transition temperature than that of resin 21. Thus in the molded product, the fastener elements 11' are comprised at least in part of resin 23 and are rendered less soft and less susceptible to deformation by the heat of preheater 32, and so more accurately preserve their profile when subjected to sufficient heat to render the resin 21 of the web readily stretchable. Other advantages of FIG. 14 and the product formed thereby is that the resin 23 of the hooks 11' (FIG. 14*a*) can be selected for its properties related to peel and shear strength of the fastener elements 11', whereas the resin 21 of the base web 10' can be selected for optimal base web properties, for instance stretchability and conformability.

In FIG. 15 a system is shown comprising two mold rolls 14 and 14*a* forming a nip into which resin from extruder 18 is directed as provided in FIGS. 1 and 2. However, two additional extruders 18*a* and 18*b* are provided to apply resin to fill the mold cavities of the respective rolls 14*a* and 14. In one instance, as suggested by rolls 23 and 25, supplemental nips may be formed with the respective mold rolls into which the resin from the supplemental extruders 18*a* and 18*b* is directed. In this case the gap of the rolls 23 and 25 relative to their respective mold rolls is reduced to a minimum so that the major portion of the resin enters the mold cavities. Alternatively, doctor blades may be arranged to force resin into the mold cavities but to leave substantially no resin on the periphery that would enter the constituent of the base web. The resulting product has fastener elements 11 on one side and other elements protruding from the opposite side, for instance fastener elements 11'. The resins chosen to be extruded from supplemental extruders 18*a* and 18*b* can be similar to that resin 23 which is employed in FIG. 14, i.e. they may have greater stability under the preheating conditions than the resin forming the main body of the web 12' and the capability to retain their shape and integrity while the web of base resin provided by extruder 18 is heated and stretched. The product resulting from the process and use of the machine described in FIG. 15 is shown in FIG. 15*a* in which the base web 10' is comprised of one resin, the upper fastening elements 11 are formed of a second resin, and the lower fastening elements 11' are formed of a third resin.

As depicted in FIG. 16, a radiant preheater 32*a* can be employed in which radiant elements 35 direct radiant energy to the product 10 to bring it to stretchable condition. Advantageously the resin provided by the supplemental extruders 18*a* and 18*b* may be of a reflective or light colored pigment that limits the amount of absorption of radiation by the projecting elements 11 and 11' whereas the resin provided by extruder 18 may for instance be black or otherwise highly absorptive to receive and absorb the radiant energy. (A similar function may be served by the resin provided in FIG. 14 for forming the fastener elements 11'.) Advantageously in certain instances the resin chosen for extruder 18*a* has different properties than the resin chosen for extruder 18*b*. For example, in one case the resin chosen for extruder 18*a* is selected to solidify more quickly than that of the resin of extruder 18*b* and be more readily separable from its mold roll at the nip, the resin for extruder 18*b* having longer time to cool as movement progresses with the roll 14 toward stripping roll 22*a*.

Whereas preheaters have been discussed in respect of all the preceding embodiments, in another embodiment arranged for inline production, the lateral stretching is conducted close to the mold roll 14 and receives the product 10 directly from the controlled-temperature roll in a soft and stretchable condition. In this case the heat of the extrusion and forming process is employed to provide the web in stretchable condition for the action of the lateral stretching unit 40. In this connection, it is noted that the projecting fastener elements 11 have significant exposed surface area relative to their volume and under the appropriate conditions, cool more quickly than the base web 12, and thus are more solid and resistant to deformation during the stretching process than is the base web itself, which, in most cases, is desired.

In another embodiment an added material is laminated to the stretched product on the side of the web opposite the fastener members, as shown in FIG. 17. After leaving tenter frame 40, with the back surface of the web 99 of the product in a heat-softened condition, added material 100 from a source spool 102 is brought into contact with the back surface of the web as the web is passed over a laminating roller 104 before being spooled on takeup roller 106. In the embodiment shown, the web 99, under a degree of tension, is trained about an arc of the laminating roll, which thereby exerts pressure between the web 99 and the added material. The softened web 99 permanently adheres to added material 100 applied by the laminating roller, to form a two-sided product 108 that may be many feet wide, with fastener members on one side and the added material on the other side.

In one embodiment, the added material is a wall covering to which hooks are thus applied for removably fastening the wall covering to a wall.

In another embodiment floor mats, e.g. for automobiles, are produced, with the added material comprising fibrous carpeting on the top, and molded fastener hooks underneath to secure the floor mat to the permanent floor covering of the automobile.

In another embodiment, area rugs are formed, with the added material providing a top rug surface and the web providing fastener elements to fasten to a permanent floor covering.

For making these and other products, in certain embodiments, further steps are employed to achieve adhesion between the added material and the web that carries the fastener elements. For example, in one instance (FIG. 18), an adhesive 110 is applied to the added material (and/or web) before it is laminated to the web. In another arrangement (FIG. 19), the added material and web are "flame-laminated" by flame-softening (in some cases, actually setting fire to) the added material (and/or web) before laminating. In yet another configuration (FIG. 20), air jets 112 help to press the two layers of the laminate together against the laminating roller to augment the adhesion of the layers. Combinations of these and other adhesion-enhancing techniques are likewise useful.

A number of products demonstrate the practicality of the invention. The following examples are given:

In a first example, a 12 melt flow polypropylene with a glass transition temperature near room temperature was molded to produce hook-shaped fastener elements with an overall height of about 0.035 inch, and an area density of 750 hooks per square inch, on a 0.012 inch thick, 12 inch wide, web. Batches of the molded product were stretched to final widths of 3, 4, 5 and 6 feet, resulting in web thicknesses of 0.005, 0.004, 0.003 and 0.002 inch, respectively. Little or no hook deformation occurred during the stretching process.

In another example, a fractional melt flow polypropylene was molded to produce hooks 0.028 inches in height with an area density of 900 hooks per square inch. Rip-stop formations were molded with the fastener elements on a web of about 0.005 inch thickness. The product was stretched widthwise to ratios of 3:1 and 4:1, reducing the web thickness to 0.0015 and 0.001 inch. It was noted that the resulting web thickness was more uniform across the product at the higher stretch ratios. Again, little or no deformation of the fastener elements occurred during the stretching, producing a usable fastener strip with widths of 30 and 40 inches.

The same product as the above example, after being stretched to twice its width in a tenter frame, was trimmed to lengths of the original width and run through the tenter frame again to perform a 2:1 lengthwise stretch. The final web thickness was about 0.001 inch, with the spacing between fastener members doubled in both the widthwise and lengthwise directions.

A 12 inch nylon 6/6 fastener strip was produced by stretching a 6 inch wide web with 0.100 inch high hooks arranged with an area density of about 147 hooks per square inch. The web thickness was reduced in half to about 0.006 inch.

A bottle grade polyethylene terephthalate with a glass transition temperature of about 150 degrees Fahrenheit was used in the same molding apparatus as in the nylon example above, and then stretched to four times its molded width to produce a very flexible fastener product four feet wide with a web thickness of only 0.001 inch.

A low density polypropylene with a glass transition temperature well below room temperature was molded to produce a 0.008 inch thick, 12 inch wide web with 0.035 inch high hook-shaped fastener elements with an initial area density of about 750 hooks per square inch. An attempt to stretch the product to a final width of four feet resulted in localized tearing and a reduction in the height of the hooks. Usable product was produced in stretched widths of two and three feet with little or no hook deformation and web thicknesses of 0.004 and 0.003 inch.

What is claimed is:

1. A fastener product comprised of synthetic resin and having multiple rows of fastener elements extending in a first direction along a running web base upon which the fastener elements are integrally molded, the web portions between the rows of elements having a molecular orientation disposed at an angle to the first direction as a result of the product having been stretched, after molding, to a width of at least twice its as-molded width.

2. A fastener product comprised of synthetic resin and having a multiplicity of rows of molded fastener elements extending along a running web base upon which the fastener elements are integrally molded, the web base between the rows of elements having a degree of molecular orientation in a first direction as a result of being stretched prior to molding, and a degree of molecular orientation in a second direction, perpendicular to said first direction, as a result of being permanently stretched after molding.

3. The product of claim 1 or 2 in which the fastener elements comprise hook elements with profiles set at a bias direction relative to the running length of the web.

4. The product of claim 1 or 2 in which said web portions between the rows of elements have a thickness of less than 0.003 inch.

5. The product of claim 1 or 2 having a width of at least eight feet.

6. The product of claim 1 having molecular orientation in the widthwise direction providing tear resistance in the lengthwise direction.

7. The product of claim 6 also having molecular orientation in the lengthwise direction providing tear resistance in the widthwise direction.

8. The product of claim 1 or 2 wherein the resin comprises a thermoplastic resin having a flex modulus of at least 150,000 pounds per square inch.

9. The product of claim 8 wherein the thermoplastic resin comprises an element selected from the group consisting of PET, polypropylene, and copolymers containing PET and copolymers containing polypropylene.

10. The product of claim 8 wherein the resin comprises a thermoplastic resin having a flex modulus of at least 250,000 pounds per square inch.

11. The product of claim 1 or 2 wherein the resin comprises a thermoplastic resin having a glass transition temperature of at least 30 degrees Celsius.

12. A useful article having a non-planar surface to which is adhered the product of claim 1 or 2, the web conforming to said non-planar surface.

13. A decorative covering comprising the product of claim 1 or 2 and a sheet material in a laminated state, the fastener elements of the product providing a means to secure said covering in a desired position.

14. The decorative covering of claim 13 comprising a wall covering.

15. The decorative covering of claim 13 comprising a floor covering.

16. A fastener product comprised of synthetic resin and having a multiplicity of rows of molded fastener elements extending along a running web base upon which the fastener elements are integrally molded, the web base between the rows of elements being in a permanently stretched condition only in a direction transverse to the direction of extent of the rows of fastener elements.

17. A fastener product comprised of synthetic resin and having a multiplicity of rows of molded fastener elements extending along a running web base upon which the fastener elements are integrally molded, wherein the entire web base between the rows of elements being in a permanently and uniaxially stretched condition in a direction transverse to the direction of extent of the rows of fastener elements.

* * * * *